Patented May 15, 1951

2,552,568

UNITED STATES PATENT OFFICE 2,552,568

FLUOROSULFONIC ACID TREATMENT OF HEXACHLOROCYCLOPENTADIENE

Earl T. McBee and Jack S. Newcomer, West Lafayette, Ind., assignors to Purdue Research Foundation, West Lafayette, Ind., a corporation of Indiana No Drawing. Application October 1, 1948, Serial No. 52,409

6 Claims. (Cl. 260—586)

This invention relates to a method of treating hexachlorocyclopentadiene, and is more particularly concerned with a method of forming octachloro - $3a,4,7,7a$-tetrahydro-4,7-methanoindene-1,8-dione directly from hexachlorocyclopentadiene by treatment thereof with fluorosulfonic acid. This application is a continuation-in-part of our application Serial 757,946, filed June 28, 1947.

Prior art methods for the preparation of octachloro - $3a,4,7,7a$-tetrahydro - 4,7-methanoindene-1,8-dione involve the use of a ketone [T. Zinke, Ann. 367, 7 (1909)] to produce the dimer. The methods involve, to mention a few, (a) heating pentachlorocyclopentenone, (b) reduction of a hexachlorocyclopentenone of melting point 92 degrees centigrade with stannous chloride, (c) reduction of a hexachlorocyclopentenone of melting point 28 degrees centigrade with stannous chloride, and other methods, all of which are based on degradation to a pentachlorocyclopentenone, dehydrochlorination, and dimerization of the resulting tetrachlorocyclopentadienone.

It is an object of the present invention, therefore, to eliminate the step of forming a ketone in the preparation of octachloro-$3a,4,7,7a$-tetrahydro-4,7-methanoindene-1,8-dione from hexachlorocyclopentadiene. It is a further object of this invention to produce octachloro-$3a,4,7,7a$-tetrahydro-4,7-methanoindene-1,8-dione directly from hexachlorocyclopentadiene in a single step. Another object of the invention is the provision of a novel process for the treatment of hexachlorocyclopentadiene with fluorosulfonic acid. Other objects will become apparent hereinafter.

The compound produced by the method of the present invention is an important intermediate in the preparation of more complex organic molecules, such as perchloroindone, which may be subsequently converted to terachlorophthalic anhydride, a valuable constituent in the preparation of resins of the glyceryl phthalate type.

The process of the present invention includes the reaction of fluorosulfonic acid with hexachlorocyclopentadiene. The result of our new process was not to be expected, since such is not obtained by the reaction of hexachlorocyclopentadiene and chlorosulfonic acid. The reaction can be performed in any suitable manner, such as by adding the fluorosulfonic acid to the hexachlorocyclopentadiene, the reverse procedure also being entirely satisfactory. Agitation is helpful in assuring efficient contact of the reactants. The reaction temperature usually employed is between about 60 degrees and about 140 degrees centigrade, with the optimum temperature being between about 80 degrees and about 120 degrees centigrade, although others may be used if desired. It is, in most instances, preferable to add the fluorosulfonic acid to the hexachlorocyclopentadiene portionwise with stirring to avoid loss of reactants and reaction products which may occur with exothermic reactions. The time allowed for reaction is of secondary importance, since the reaction appears to be substantially instantaneous. However, reaction periods of from about one-half hour to several days may be employed, with the shorter periods being, of course, most desirable. The ratio of reactants is not critical, and while about equimolar proportions are generally employed, an excess of either is not disadvantageous, and in some instances an advantage may even be gained by employment of an excess of one reactant or the other. The reaction may be conducted in the presence or absence of a liquid organic solvent which is inert to the reactants and reaction products under conditions of reaction. The octachloro-tetrahydro-methanoindene-dione, either as the anhydrous or hydrous form, may be separated from the reaction product and purified in any conventional manner, such as by recrystallization, which will be apparent to one skilled in the art. The hydrate is obtained if water is present in the reaction mixture or is contacted with the reaction product, and the anhydrous form may be obtained from the hydrate by recrystallization from an organic solvent. The anhydrous form is obtained directly when an organic solvent is used for crystallization of the reaction product.

The following example is given to illustrate the practice of this invention but is not, however, to be construed as limiting.

The anhydrous form of octachloro-$3a,4,7,7a$-tetrahydro - 4,7 - methanoindene - 1,8 - dione was prepared by adding 400 grams of fluorosulfonic acid to 544 grams of hexachlorocyclopentadiene during a period of two hours at 80 to 100 degrees centigrade, dropping the reaction mixture into water to obtain the hydrate, and recrystallizing the hydrate from petroleum ether to obtain the anhydrous product.

The equipment consisted of a stainless steel beaker of about one-gallon capacity equipped with a motor-driven stirrer, thermometer, and dropping funnel. Profusive fuming occurred throughout the reaction. The crude orange-red liquid product was poured onto ice and washed three times with water, the liquid becoming thicker after each washing. The final washing resulted in the separation of a solid, which was filtered to give a yellow solid and an orange-red organic layer in the filtrate. The solid was recrystallized from petroleum ether to give a white solid which melted at 166–170 degrees centigrade and contained 65.2 percent chlorine. The dimer of tetrachlorocyclopentadienone, octachloro-3a,4,7,7a-tetrahydro-4,7-methanoindene-1,8-dione, melts at 164–170 degrees centigrade and contains 65.2 percent chlorine. The conversion was 34 percent of the theoretical.

Various modifications may be made in the method of the present invention without departing from the spirit or scope thereof, and it is to be understood that we limit ourselves only as defined in the appended claims.

We claim:

1. The method which includes: mixing together hexachlorocyclopentadiene and fluorosulfonic acid and heating the reaction mixture to cause reaction between the hexachlorocyclopentadiene and the fluorosulfonic acid to produce octachloro-3a,4,7,7a-tetrahydro-4,7-methanoindene-1,8-dione.

2. The method which includes: mixing together hexachlorocyclopentadiene and fluorosulfonic acid and heating the mixture at a temperature between about 60 degrees and 140 degrees centigrade to produce octachloro-3a,4,7,7a-tetrahydro-4,7-methanoindene-1,8-dione, and separating octachloro-3a,4,7,7a-tetrahydro-4,7-methanoindene-1,8-dione from the reaction product.

3. The method of claim 2, wherein the reaction product is contacted with water and octachloro-3a,4,7,7a-tetrahydro-4,7-methanoindene-1,8-dione hydrate separated.

4. The method which includes: mixing together, at a temperature between about 60 degrees and about 140 degrees centigrade, hexachlorocyclopentadiene and fluorosulfonic acid, to produce octachloro-3a,4,7,7a-tetrahydro-4,7-methanoindene-1,8-dione.

5. The method of claim 4, wherein the temperature is between about 80 degrees and about 120 degrees centigrade.

6. The method of claim 4, wherein the fluorosulfonic acid is added portionwise to the hexachlorocyclopentadiene.

EARL T. McBEE.
JACK S. NEWCOMER.

REFERENCES CITED

The following references are of record in the file of this patent:

UNITED STATES PATENTS

| Number | Name | Date |
|---|---|---|
| 2,179,809 | Bockemuller | Nov. 14, 1939 |

OTHER REFERENCES

Prins Rec. Trav. Chim., vol. 65, pages 455 to 467 (1946).

Zincke et al. Annalen, vol. 367, pages 1 to 13 (1909).